US006989113B1

(12) United States Patent
Mabey

(10) Patent No.: US 6,989,113 B1
(45) Date of Patent: Jan. 24, 2006

(54) FIRE RETARDANT

(75) Inventor: Michael John Mabey, Sherwood Park (CA)

(73) Assignee: No-Burn Investments, L.L.C., Wadsworth, OH (US)

(*) Notice: Subject to any disclaimer, the term of this patent is extended or adjusted under 35 U.S.C. 154(b) by 626 days.

(21) Appl. No.: 10/132,958

(22) Filed: Apr. 26, 2002

Related U.S. Application Data

(60) Provisional application No. 60/287,149, filed on Apr. 30, 2001.

(51) Int. Cl.
 C09K 21/04 (2006.01)
 C09K 21/08 (2006.01)
 C09K 21/10 (2006.01)
 C09K 21/14 (2006.01)

(52) U.S. Cl. .................. 252/606; 252/603; 252/607; 252/608; 252/609; 106/18.16; 523/179

(58) Field of Classification Search ............... 252/603, 252/606, 607, 608, 609; 106/18.16; 523/179
See application file for complete search history.

(56) References Cited

U.S. PATENT DOCUMENTS

| | | | |
|---|---|---|---|
| 3,196,108 A | 7/1965 | Nelson | |
| 3,257,316 A | 6/1966 | Langguth et al. | |
| 3,309,324 A | 3/1967 | Langguth et al. | |
| 3,513,114 A * | 5/1970 | Vandersall et al. ......... | 523/179 |
| 3,634,234 A | 1/1972 | Morgenthaler | |
| 3,730,890 A | 5/1973 | Nelson | |
| 3,934,066 A | 1/1976 | Murch ........................ | 428/248 |
| 3,955,987 A | 5/1976 | Schaar et al. ............. | 106/15 FP |
| 3,960,735 A | 6/1976 | Lacey | |
| 3,969,291 A * | 7/1976 | Fukuba et al. ............... | 523/179 |
| 4,028,333 A | 6/1977 | Lindvay ............... | 260/45.8 NT |
| 4,137,849 A | 2/1979 | Hontgas et al. ........... | 102/56 R |
| 4,166,840 A * | 9/1979 | Chapman ................... | 423/313 |
| 4,201,593 A | 5/1980 | Sienkowski et al. ..... | 106/18.14 |
| 4,201,677 A | 5/1980 | Shukla et al. ................. | 252/8.1 |
| 4,205,022 A | 5/1980 | Nicholson et al. .......... | 260/953 |
| 4,210,452 A | 7/1980 | Nicholson et al. ....... | 106/18.18 |
| 4,216,261 A * | 8/1980 | Dias .............................. | 442/84 |
| 4,221,837 A | 9/1980 | Nicholson et al. .......... | 428/288 |
| 4,226,907 A | 10/1980 | Sienkowski et al. ........ | 428/288 |
| 4,241,145 A | 12/1980 | Shukla ....................... | 428/537 |
| 4,265,791 A | 5/1981 | Nicholson et al. ........... | 252/8.1 |
| 4,339,357 A | 7/1982 | Nicholson et al. .......... | 252/606 |
| 4,345,002 A | 8/1982 | Smith et al. ................ | 428/288 |
| 4,365,025 A | 12/1982 | Murch et al. ................ | 521/159 |
| 4,447,336 A | 5/1984 | Vandersall | |
| 4,447,337 A | 5/1984 | Adl et al. | |
| 4,588,510 A * | 5/1986 | Salyer et al. ................... | 252/5 |
| 4,595,414 A * | 6/1986 | Shutt ....................... | 106/18.16 |
| 4,606,831 A | 8/1986 | Kegeler et al. | |
| 4,632,813 A * | 12/1986 | Anastasi et al. ............ | 423/310 |
| 4,668,710 A | 5/1987 | Pawloski et al. | |
| 4,686,241 A | 8/1987 | Pawloski et al. | |
| 4,744,965 A * | 5/1988 | Fairchild ..................... | 423/310 |
| 4,822,524 A | 4/1989 | Strickland | |
| 4,839,065 A | 6/1989 | Vandersall | |
| 5,064,710 A | 11/1991 | Gosz .......................... | 428/182 |
| 5,165,904 A * | 11/1992 | Staffel et al. ............... | 423/305 |
| 5,246,652 A | 9/1993 | Hsu et al. | |
| 5,603,990 A | 2/1997 | McGinniss et al. ....... | 427/393.3 |
| 5,626,787 A * | 5/1997 | Porter ........................... | 252/4 |
| 5,645,926 A * | 7/1997 | Horrocks et al. ........... | 442/234 |
| 5,882,541 A * | 3/1999 | Achtmann ................. | 252/8.05 |
| 5,925,457 A * | 7/1999 | McGinniss et al. ......... | 428/341 |
| 5,968,669 A | 10/1999 | Liu et al. | |
| 5,989,706 A | 11/1999 | McGinniss et al. ......... | 428/341 |
| 5,997,758 A * | 12/1999 | Barbarin et al. ............... | 252/3 |
| 6,001,285 A | 12/1999 | Wunram | |
| 6,025,027 A | 2/2000 | Shutt | |
| 6,084,008 A | 7/2000 | Liu | |
| 6,130,267 A | 10/2000 | Dueber et al. | |
| 6,162,375 A | 12/2000 | Crouch et al. | |
| 6,207,085 B1 * | 3/2001 | Ackerman .................. | 252/606 |
| 2005/0022466 A1 * | 2/2005 | Kish et al. ................. | 52/741.3 |

OTHER PUBLICATIONS

Farrell et al., *Environmental Toxicology and Chemistry*, abstract for vol. 17, No. 8, pp. 1552-1557, 1998.

Kia Inc., Kemco International Associates Biocides (www.kemcointernational.com/Biocides.htm) downloaded Dec. 16, 2004.

The Cary Company, web site Home Page, Products and Flame Retardants & Smoke Suppressant Additives web site pages (www.thecarycompany.com/Home.html) (www.thecarycompany.com/products1.html) (www.thecarycompany.com/products/Kemgard.html) downloaded Dec. 16, 2004.

Verichem Inc., web site information and product line pages (www.verichem.org/pages/5/page5.html?refresh=1079996004846) (www.verichem.org/pages/3/page3.html?refresh=1079996005142) (www.verichem.org/pages/2/page2.html?refresh=1079996005008) downloaded Dec. 21, 2004.

U.S. Utility Appl. No. 10/957,775, filed on oct. 4, 2004 A.D., Kish et al.

U.S. Utility Appl. No. 11/002,730, filed on Dec. 2, 2004 A.D., Mabey.

U.S. Provisional Appl. No. 60/287,149, filed on Apr. 30, 2001 A.D., Mabey.

U.S. Provisional Appl. No. 60/526,456, filed on Dec. 3, 2003 A.D., Mabey.

\* cited by examiner

*Primary Examiner*—Joseph D. Anthony
(74) *Attorney, Agent, or Firm*—Christopher John Rudy

(57) ABSTRACT

Fire retardant composition includes an ammonium phosphate substance, which is in contact with a carbonific, for example, glucose, and a nitrogenous spumific, for example, urea. A polysaccharide and/or a nonionic alkylpolyglycoside surfactant may be present. The composition may be in the form of a clear, aqueous liquid.

18 Claims, No Drawings

FIRE RETARDANT

This claims benefit under 35 USC 119(e) of U.S. provisional patent application No. 60/287,149 filed on Apr. 30, 2001 A.D. The complete specification of that application is incorporated herein by reference.

FIELD AND PURVIEW OF THE INVENTION

In general, of concern are a fire retardant composition, methods to make and use it, and a substrate in combination with the composition or residue thereof. The composition includes a first fire retardant agent of an ammonium phosphate substance, which is in contact with a carbonific, for example, glucose or pentaerythritol, and a nitrogenous spumific, for example, urea. A clear, aqueous liquid may be formed.

BACKGROUND TO THE INVENTION

Various fire retardants are known for certain applications. For instance, compositions are known, which typically contain fire suppressing salts such as an ammonium phosphate or ammonium sulphate, for aerial application to combat forest fires. See, U.S. Pat. Nos. 3,196,108; 3,257,316; 3,309,324; 3,634,234; 3,730,890; 3,960,735; 4,447,336; 4,447,337; 4,606,831; 4,822,524; 4,839,065; 4,983,326 and 6,162,375. Other compositions are known to contain other fire suppressants such as carbonaceous matter, organic phosphorous compounds, organic halides, or borates. See, U.S. Pat. Nos. 4,668,710; 4,686,241; 5,246,652; 5,968,669; 6,001,285; 6,025,027; 6,084,008 and 6,130,267.

As can be appreciated, in addition to fire retardants used to combat forest fires, intended as a temporary measure to be washed away with rain once the fire threat is minimized, prevention of the spread of fire is an important consideration sought in many everyday materials and construction applications such as paper, wood, fabric and many plastics. As such, much research has been conducted to determine how to reduce or eliminate the potential fire hazards caused by such materials.

In general, all organic and some inorganic materials will burn under appropriate conditions. With solid materials, this involves decomposition of the solid to produce gases which burn, rather than combustion of the solid per se. Actual burning of an item occurs in four main stages: 1) heating: an ignition source raises the temperature of the item; 2) decomposition: when sufficiently heated, the item begins to change its properties and break down, forming combustible gases; 3) ignition: combustible gas production increases until a concentration is reached that allows for sustained, rapid oxidation when exposed to an ignition source; and 4) combustion and propagation: combustion of the gases becomes self-propagating if the heat generated is sufficient to be radiated back to the item and continue the heating and decomposition steps.

Decades ago, most home furnishings were made from natural materials including wool, cotton and horse hair, which were relatively flame resistant; so, if a fire started in the home, it would generally take some eight to ten minutes before flash-over would occur, depending on a fire's location, and availability of flammable materials in close proximity to the source of the fire. If discovered quickly enough, the fire department would arrive to extinguish the blaze before it grew too rapidly and flash-over occurred. Flash-over, of course, occurs when the rate of combustion and flame spread in the dwelling becomes so rapid that the air becomes super heated, which causes all exposed flammable surfaces to erupt into flames, i.e., "flash over." This produces the equivalent of an explosion, blowing out doors and windows, and causing serious bodily injury or death. Now, however, most everyday household materials are extremely flammable themselves, being made not only of paper and wood but also synthetic fabric and plastic, the latter, of course, made from petroleum products. Thus, flash-over is of increasingly serious concern, and the time it takes for the modern untreated materials to flash-over has significantly decreased. Some of the modern materials may practically burst into flames with a short exposure to the ignition source, and flash-over may occur before the fire department can get to the home, even if notified promptly. As can readily be appreciated, therefore, the residential fires of today can be most tragic when compared to those of past years.

In addressing the same, conventional intumescent systems have been developed. They typically include as essential components 1) an acid-forming substance; 2) an expanding agent, which causes formation of a foamed (intumescent) layer by emission of an inert or non-combustible gas, referred to as a "spumific"; and 3) a binder such as a thermoplastic resin, which contributes to film-forming properties of the system and provides a portion of a char skeleton, and which is referred to as a "carbonific." A component may have more than one function. Typical state of the art conventional phosphate-catalyzed intumescent compositions can be composed of components selected from among the following:

1. As the acid source (catalyst), usually amino phosphates, mainly ammonium polyphosphates, ammonium orthophosphate, and melamine phosphate, say, in an amount of about 25% by weight of the total formulation.
2. As the spumific, melamine, melamine salts, melamine derivatives, urea and/or dicyandiamide.
3. As the carbonific, polyhydroxy compounds, usually a polyol, which is decomposed by liberated phosphoric acid to form an ester which results in formation of the char (carbonification), for example, pentaerythritol, dipentaerythritol, tripentaerythritol, or certain sugars, starches or starch derivatives.

Two disadvantages with the conventional systems are cost and opacity. Opaque compounds such as ammonium polyphosphate in powder form, powdered amines and carbonific components are often employed. These tend to be not only expensive, owing to the materials and their labor-intensive production, but also less desirable aesthetically, say, on woodwork where its exposed surface is sought after as an architectural feature.

Also, many conventional fire retardant compositions utilize non-biodegradable ingredients. These may pose a threat to the health of an applicator or occupant, or to the environment.

It would be desirable to ameliorate if not completely overcome one or more of such problems.

SUMMARY OF THE INVENTION

In general, this invention provides, in one aspect, a fire retardant composition comprising a mixture of a substantially neutral ammonium phosphate salt in combination with an active hydrogen-containing nitrogenous organic compound, and with a hydroxy-containing carbonific. In other aspects, the composition can be made by contacting a phosphoric acid with ammonia to form the ammonium phosphate, contacting the ammonium phosphate with the active hydrogen-containing nitrogenous organic compound and the hydroxy-containing carbonific under conditions sufficient to form the composition; and can be used by contacting it with a flammable substrate under conditions sufficient to be flame retardant. In another aspect, an article of manufacture is provided which comprises, in combination, the fire retardant composition and the flammable substrate or a residue of the same.

The invention is useful in retarding fire.

Significantly by the invention, an effective, cost-efficient, aesthetically pleasing and/or generally safe fire retardant is provided. The invention ameliorates or even completely solves one or more of the problems in the art. Notably, for example, flammable construction stock such as wooden boards are provided with good fire retarding ratings; cost of materials and labor to prepare the composition can be maintained low, and application of the composition is simple and easy; a clear formulation can be provided to highlight the beauty of natural woodwork; and use of the composition is not known, in general, to engender unduly harmful side-effects, nor to unduly stress the environment. The composition may be considered an intumescent fire retardant.

Numerous further advantages attend the invention.

DETAIL FURTHER ILLUSTRATIVE OF THE INVENTION

The invention can be further understood by a reading of the present detail. The same is to be taken in an illustrative, and not necessarily limiting, sense.

The invention is based upon the discovery that a clear fire retardant surface treatment can result from reacting phosphoric acid with ammonium hydroxide in a stoichometric ratio sufficient to make an aqueous solution of substantially neutral pH which includes monoammonium and diammonium phosphates, in an exothermic reaction. The solution, which is an example of an essentially or substantially neutral ammonium phosphate salt, next is contacted or combined, perhaps reacted, with an active hydrogen-containing nitrogenous organic compound such as urea, and also with a hydroxy-containing carbonific such as glucose or pentaerythritol to produce a typically viscous solution as the fire retardant. The fire retardant composition of the invention accordingly may be considered, in certain embodiments, to be a substantially if not essentially neutral ammonium phosphate salt in a matrix of a urea and a hydroxy-containing carbonific, which forms a coating.

The term, "fire retardant composition," as employed herein is a composition that, when it is applied to a flammable material, provides thermal protection for the material. In general, this may be done by reducing or perhaps even eliminating the tendency of the material to burn and/or reducing the rate of flame spread along the surface of the material. Preferably, use of the fire retardant composition, for example, on a solid material, reduces surface burning characteristics significantly, say, at least about 10%, at least about 25%, or at least about 50%, when compared to untreated material, as tested by an appropriate test. For example, the test may be the ASTM E84 Steiner Tunnel Test. Without being bound by any theory, the fire retardant composition is believed to operate generally as follows: The fire retardant composition decomposes under the heat of the fire to produce nonflammable gas as well as a light weight char, which occurs at a lower temperature than the item on which it is applied would release flammable gases. The char is formed as the ammonium phosphate breaks down, releasing ammonia gas, which leads to reaction of the phosphate with the carbon-bearing compounds to form a nonflammable ester. As the nitrogen-containing compounds break down to release nonflammable gas, the gas becomes trapped in the carbon mass, tending to puff it up, forming a char pillow. The char pillow, by reducing air flow, hence, oxygen, as well as by reducing or blocking heat transfer to the surface, tends to reduce the burning propensity of the treated surface. As a result, the fire is robbed of fuel and oxygen, generates less heat and less smoke, and in some cases may extinguish itself.

As the substantially neutral ammonium phosphate salt, any suitable ammonium phosphate, to include ammonium polyphosphates, and mixtures thereof, may be employed. Preferably, however, the substantially neutral ammonium phosphate salt is a mixture which contains monoammonium and diammonium phosphates. The salt may be employed per se or in conjunction with a diluent. Preferably, a diluent is employed, and, advantageously, the diluent acts as a solvent. Beneficially, the diluent is evaporative, which is to say that it can evaporate in the final product, fire retardant composition, leaving the composition or a residue thereof with the substrate to which the fire retardant composition is applied. As such the diluent acts as a carrier. The diluent can be any suitable substance, including a hydroxy-containing liquid such as an alcohol, water, or mixture thereof. Water is preferred. In one advantageous embodiment, the substantially neutral ammonium salt can be provided as an aqueous solution having monoammonium and diammonium phosphates by reacting an about from sixty to ninety-five, preferably about from seventy to ninety, percent by weight solution of phosphoric acid with an about from fifteen to forty, preferably about from twenty to thirty-three, percent by weight solution of aqueous ammonia in a ratio sufficient to produce a mixture with a substantially neutral pH, say, about from six to seven and a half, preferably about from 6.6 to 7.0. Such a solution may be commercially obtained.

The substantially neutral ammonium phosphate salt is combined with the active hydrogen-containing nitrogenous organic compound, i.e., the spumific, and the hydroxy-containing carbonific. The combination, or contact, of the components may be carried out in any suitable order. Thus, the contact may be salt to spumific to prepare a salt-spumific intermediate, followed by contact with the carbonific; or the contact may be salt to carbonific to prepare a salt-carbonific intermediate, followed by contact with the spumific. As an alternative, the spumific and carbonific may be mixed, and that mixture may be contacted with the salt. Other component(s) such as wetting agent(s), defoaming agent(s) and so forth may also be added at suitable time(s). Conditions are those sufficient to form the fire retardant composition.

As the hydrogen-containing nitrogenous organic compound, or spumific, any suitable substance may be employed. Preferably, the spumific is compatible with the other components employed, and further is soluble therewith or with any diluent employed. For instance, urea or a substituted urea may be employed. Preferably, however, the spumific is urea.

As the hydroxy-containing carbonific, any suitable substance may be employed. Preferably, the carbonific is compatible with the other components employed, and further is soluble therewith or with any diluent employed, especially water. For instance, a polyol, to include carbohydrates such as sugars and starches, may be employed. The polyol thus may be a compound such as glycerol, pentaerythritol, dipentaerythritol, tripentaerithritol, or a sugar, say, a monosaccharide such as a triose, tetrose, pentose, hexose, heptose or octose, to include aldoses and ketoses, or a disaccharide, a trisaccharide and so forth. A polysaccharide may be employed. Thus, the carbonific can include a six-carbon aldose, with which the polysaccharide may be employed.

A wetting agent, or surfactant, may be employed. Preferably, the surfactant is biodegradable. Generally, when employed, the surfactant is present in an amount sufficient to effectively release surface tension in the composition and to allow it to effectively and evenly penetrate the flammable substrate before substantial evaporation of a diluent. Any suitable surfactant may be employed. Preferably, however, the surfactant is a nonionic alkylpolyglycoside, which, for instance, may be obtained commercially, say, under the mark GLUCOPON (Henkel Corporation). The GLUCOPON surfactants are more readily biodegradable than conventional petroleum-based surfactants, and have been found to be much safer in testing with land and marine animals, while having performance comparable to the conventional surfactants in fire retardant compositions. GLUCOPON surfactants, which were specifically formulated for cleaning product technology, are made from renewable raw materials: glucose from corn, and fatty alcohol from coconut and palm kernel oils. They are typically supplied as aqueous solutions containing 50–70% active matter, having an alkaline pH (11.5 to 12.5) with no added preservative. Some GLUCOPON surfactants are also available at neutral pH with an antimicrobial preservative added. Although perhaps any grade of GLUCOPON surfactant may be used successfully in the practice of the present invention, preferably, GLUCOPON-425 is employed.

A defoaming agent may be employed. Any suitable defoamer may be employed, say, a salicylate salt or a silicon compound. Preferably, the defoaming agent is potassium salicylate.

Any suitable amount of a component may be employed. Typical amounts as percents by weight of preferred components effective in the practice of the invention, however, are listed as follows:

| | |
|---|---|
| Mono/diammonium phosphates | 20~70% |
| Diluent (solvent) of water | 25~50% |
| Urea | 2.5~15.0% |
| Glucose | 4.0~12.0% |
| Polysaccharide resin | 2.0~40.0% |
| GLUCOPON-425 surfactant | 0.2~1.2% |
| Potassium salicylate solution | 0.01~0.1%. |

These ingredients may be stirred until dissolved, making a mixture free of solids and forming a clear liquid with pH of 6.8. The mixture, however, may be slightly cloudy yet be effective.

As an aqueous solution, the pH of the final product, fire retardant composition can be approximately neutral, for instance, about from five and one half to eight, say, about from six to seven, preferably, about from 6.6 to 6.8 or 6.9. It may have any suitable density or specific gravity, for instance, about from one to one and a half, say, about from one and a tenth to one and a third, preferably, about from 1.18 to 1.25. Active ingredients may be present in any amount, to include about from 40% to 60%, preferably, about from 45% to 55%, say, 48%±about 0.3%, of the total weight of the fire retardant composition for application.

Beneficially, the fire retardant composition can penetrate and, once dried, preferably also leave a see-through film on the surface of a flammable solid substrate. This results in a fire retardant composition or residue of the same which does not pose a substantial risk to the health of the applicator of the fire retardant, nor to the occupant or visitor to the home or other building or area in which the fire retardant is applied, nor is it known to be harmful to the natural environment. This results also in a versatile fire retardant composition which can be employed in situations in which the aesthetic appearance of a substrate such as natural woodwork is desired to remain visible or in which it would be beneficial to retain visual integrity of a substrate. The preferred liquid fire retardant composition of the invention can be readily absorbed by porous materials such as wood, fabric, cardboard, and so forth, where it may remain indefinitely if it is protected from rain and other forms of excess moisture. Advantageously, there is nothing in such a composition known to be substantially harmful to wood per se or to plywood or other glued or composite wood products.

The fire retardant composition can be applied to the substrate by any suitable method. Known methods may be employed. For example, as a liquid-carrier-based formulation, the fire retardant composition may be applied by spraying, say, hand-held trigger sprayers, pump-up pressure sprayers, or any other type of manual or automatic power-assisted spraying apparatus, including airless sprayers; brushing; dipping; and so forth. Preferably, the fire retardant composition is applied by spraying. The fire retardant composition is applied at a suitable concentration or rate to produce a material treated with an effective amount of fire retardant.

The following examples further illustrate the invention. In the examples, parts and percentages are by weight unless noted otherwise.

EXAMPLE 1

A fire retardant composition of the invention was made as set forth below. In a clean, appropriately sized mixing tank, the following raw materials were added under constant agitation:

32 gallons (320 lbs.) of a 49% solution of mono/diammonium phosphate (a reaction product of 75–85% liquid phosphoric acid and 27% ammonia in water, at a ratio sufficient to produce a starting material with a pH of 6.8).

170 grams of potassium salicylate solution.

1135 grams of GLUCOPON-425 surfactant (a nonionic alkylpolyglycoside surfactant, commercially available from Henkel Corporation).

32 lbs. urea beads (fertilizer grade).

40 lbs. glucose.

All these ingredients were stirred until completely dissolved, until the mixture was free of solids and formed an essentially clear liquid with a pH of 6.8. To this mixture, while the solution was still quite warm, was added 132 lbs. of JA250-3 polysaccharide resin (commercially available from Lorama Chemicals of Mississauga, Ontario, Canada) which serves to increase the viscosity of the formulation, and to contribute solids to the char-forming reaction.

A retained sample was drawn from the completed batch and was analyzed for specific gravity, pH and clarity. The specific gravity was 1.256 at 1 degree C.; the pH was 6.8, and the sample passed the clarity test, i.e., the liquid was clear to the naked eye with no precipitate visible. The finished product was pumped into a storage tank for later transfer into proper containers, or was transferred directly to fill proper containers.

EXAMPLE 2

The liquid fire retardant composition of Example 1 was applied to the surface of Red Oak tongue-and-groove flooring at a rate of 300 square feet per U.S. gallon in two coats, and allowed to dry in a conditioned room at 72 degrees F. and 50% relative humidity until the product had dried and reached a constant mass. Once dried to constant mass, the treated flooring panels were tested in accordance with the ASTM E84 test procedure, providing a Flame Spread Rating of 35.

As a control, untreated Red Oak tongue-and-groove flooring from the same batch of lumber was also tested in accordance with the ASTM E84 test procedure. The untreated flooring panels had a Flame Spread Rating of 70.

CONCLUSION TO THE INVENTION

The present invention is thus provided. Numerous adaptations and modifications can be effected within its spirit, the literal claim scope of which is particularly pointed out as follows:

I claim:

1. A fire retardant composition comprising a mixture of a substantially neutral ammonium phosphate salt in combination with an active hydrogen-containing nitrogenous organic compound spumific, and with a hydroxy-containing carbonific, wherein:
   the substantially neutral ammonium phosphate salt has a pH about from 6 to 7½;
   the hydroxy-containing carbonific includes a polysaccharide resin in addition to or other than starch;
   the fire retardant composition as a final product, when present as an aqueous solution, has a pH about from 6 to 7; and
   the final product, when applied to the surface of a flammable wood substrate, can penetrate and, once dried, also leave a see-through film on the surface of the substrate.

2. The composition of claim 1, which further comprises at least one of a wetting agent and an antifoaming agent.

3. The composition of claim 1, wherein said salt is provided by reacting an about from seventy to ninety percent by weight solution of phosphoric acid with an about from twenty to thirty-three percent by weight solution of aqueous ammonia in a ratio sufficient to produce a mixture with a substantially neutral pH about from 6.6 to 7.0.

4. The composition of claim 3, which includes at least one of a wetting agent and an antifoaming agent.

5. The composition of claim 1, wherein said salt includes an aqueous mixture of monoammonium and diammonium phosphates; and said spumific includes urea.

6. The composition of claim 5, wherein said salt is provided by reacting an about from seventy to ninety percent by weight solution of phosphoric acid with an about from twenty to thirty-three percent by weight solution of aqueous ammonia in a ratio sufficient to produce a mixture with a substantially neutral pH about from 6.6 to 7.0.

7. The composition of claim 1, wherein starch is absent.

8. The composition of claim 6, which includes glucose.

9. The composition of claim 5, which includes a nonionic alkylpolyglycoside surfactant.

10. The composition of claim 6, which includes a nonionic alkylpolyglycoside surfactant.

11. The composition of claim 7, which includes a nonionic alkylpolyglycoside surfactant.

12. The composition of claim 8, which includes a nonionic alkylpolyglycoside surfactant.

13. The composition of claim 1, which is essentially clear.

14. A fire retardant composition comprising according to claim 1 a mixture of ingredients, with percentages tabulated by weight, as follows:

| | |
|---|---|
| Mono/diammonium phosphates | 20–70% |
| Diluent of water | 25–50% |
| Urea | 2.5–15.0% |
| Polysaccharide resin in addition to or other than starch | 2.0–40.0% |
| Sugar | 4.0–12.0% |
| Nonionic alkylpolyglycoside surfactant | 0.2–1.2% |
| Defoaming agent | 0.01–0.1% | which composition has a pH of about from six to seven.

15. The composition of claim 14, wherein the sugar includes a six-carbon aldose; the pH is about from 6.6 to 6.9, and the composition is clear to the naked eye with no precipitate visible.

16. The composition of claim 15, which includes the following tabulated ingredients, or a proportion thereof, with percentages tabulated by weight:
   32 gallons (320 lbs.) of a 49% solution of mono/diammonium phosphate, as if a reaction product of 75–85% liquid phosphoric acid and 27% ammonia in water, at a ratio sufficient to produce a starting material with a pH of 6.8;
   32 lbs. of urea;
   132 lbs. of said resin;
   40 lbs. of glucose;
   1135 grams of nonionic alkylpolyglycoside surfactant; and
   170 grams of potassium salicylate solution.

17. A method of making a fire retardant composition, which composition comprises a mixture of a substantially neutral ammonium phosphate salt in combination with an active hydrogen-containing nitrogenous organic compound spumific, and with a hydroxy-containing carbonific, wherein:
   the substantially neutral ammonium-phosphate salt has a pH about from 6 to 7½;
   the hydroxy-containing carbonific includes a polysaccharide resin in addition to or other than starch;
   the fire retardant composition as a final product, when present as an aqueous solution, has a pH about from 6 to 7; and
   the final product, when applied to the surface of a flammable wood substrate, can penetrate and, once dried, also leave a see-through film on the surface of the substrate;
which method comprises contacting a phosphoric acid with ammonia to form the substantially neutral ammonium phosphate salt; and contacting the substantially neutral ammonium phosphate salt with the active hydrogen-containing nitrogenous organic compound spumific, and the hydroxy-containing carbonific, under conditions sufficient to form the composition.

18. The method of claim 17, wherein the conditions are aqueous, and the composition formed is a clear, aqueous liquid.

* * * * *